US008254399B1

(12) United States Patent
Wang et al.

(10) Patent No.: US 8,254,399 B1
(45) Date of Patent: Aug. 28, 2012

(54) METHOD AND APPARATUS FOR ADAPTIVE BUFFER MANAGEMENT FOR TRAFFIC OPTIMIZATION ON SWITCHES

(75) Inventors: Chi-Lie Wang, Milpitas, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 310 days.

(21) Appl. No.: 12/639,887

(22) Filed: Dec. 16, 2009

(51) Int. Cl.
H04L 12/28 (2006.01)
H04L 12/56 (2006.01)
(52) U.S. Cl. ...................................................... 370/401
(58) Field of Classification Search ................. None
See application file for complete search history.

(56) References Cited

U.S. PATENT DOCUMENTS

| | | | |
|---|---|---|---|
| 6,907,453 B2 * | 6/2005 | Shankar et al. | 709/207 |
| 7,688,731 B2 * | 3/2010 | Haumont et al. | 370/235 |
| 2005/0249220 A1 * | 11/2005 | Olsen et al. | 370/395.4 |

* cited by examiner

*Primary Examiner* — Ayaz Sheikh
*Assistant Examiner* — Blanche Wong
(74) *Attorney, Agent, or Firm* — Heimlich Law, PC; Alan Heimlich, Esq.

(57) ABSTRACT

A method and apparatus for adaptive buffer management for traffic optimization on switches have been disclosed where pattern injection and traffic monitoring with forced congestion allows optimizing buffers while accounting for actual system delays.

10 Claims, 10 Drawing Sheets

1. A method comprising:
   setting a priority level denoted x to a highest priority level from a plurality of unique priority levels;
   (a) setting a buffer reservation size denoted prog_size to a minimum size;
   (b) setting a packet size denoted pkt_size to a maximum packet size;
   (c) over-subscribing a x-1 priority level denoted pri_x-1 traffic;
   (d) injecting a pre-defined number of priority x packets, said pre-defined number of priority x packets each having a packet size of pkt_size;
   (e) determining if a priority x buffer not available count denoted pri_x_buf_not_ava_cnt is less than or equal to a priority x buffer not available threshold denoted pri_x_buf_not_ava_thresh; and
   (f) if said pri_x_buf_not_ava_cnt is less than or equal to said pri_x_buf_not_ava_thresh then:
       (f1) setting said prog_size to prog_size+1; and
       (f2) returning to (d);
   (g) setting a buffer reservation size register for said priority level x denoted pri_x_prog_size to said prog_size.

2. The method of claim 1 further comprising:
   (h) setting a packet size register for said priority x denoted pri_x_pkt_size to said pkt_size;
   (i) setting said pkt_size to pkt_size -1;
   (j) injecting priority x packets, said priority x packets each having a packet size of pkt_size;
   (k) determining if said pri_x_buf_not_ava_cnt is less than or equal to said pri_x_buf_not_ava_thresh; and
   (l) if said pri_x_buf_not_ava_cnt is less than or equal to said pri_x_buf_not_ava_thresh then:
       (f1) returning to (h);
   (m) stopping said pri_x-1 traffic;
   (n) determining if said priority level x is equal to 1; and
   (o) if said priority level x is equal to 1 then:
       (o1) returning to (a).

3. The method of claim 2 further comprising:
   repeating (a)-(o) for a plurality of ingress buffers; and
   repeating (a)-(o) for a plurality of egress buffers.

4. The method of claim 3 further comprising:
   repeating (a)-(o) for a plurality of crosspoint buffers.

5. A method comprising:
   forcing congestion on all priority levels lower than a highest priority level;
   injecting traffic at said highest priority level;
   observing performance of said traffic at said highest priority level; and
   adjusting a buffer for said highest priority level based on said observed performance.

6. The method of claim 5 wherein said injecting traffic travels through actual physical system delays.

7. The method of claim 5 wherein said observing performance of said traffic includes observing said traffic traveling off of an integrated circuit (IC).

8. The method of claim 7 wherein said traffic traveling off of an IC is selected from the group consisting of delays off said IC, latency off said IC, and trace delays off said IC.

FIG. 9

10. An apparatus comprising:
   a plurality of ingress ports, wherein each of said plurality of ingress ports has a plurality of ingress buffers, said plurality of ingress buffers each having a plurality of programmable buffer reservation size registers, and a plurality of not available counters, and a plurality of buffer not available threshold registers, and a plurality of packet size registers.

11. The apparatus of claim 10 wherein each of said plurality of ingress buffers, and each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels.

12. The apparatus of claim 10 further comprising:
   a plurality of crosspoint buffers, said plurality of crosspoint buffers each having a plurality of programmable buffer reservation size registers, and a plurality of not available counters, and a plurality of buffer not available threshold registers, and a plurality of packet size registers; and
   said plurality of crosspoint buffers in operative communication with said plurality of ingress buffers.

13. The apparatus of claim 12 wherein each of said plurality of crosspoint buffers, and each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

14. The apparatus of claim 12 further comprising:
   a plurality of egress ports, wherein each of said plurality of egress ports has a plurality of egress buffers, said plurality of egress buffers each having a plurality of programmable buffer reservation size registers, and a plurality of not available counters, and a plurality of buffer not available threshold registers, and a plurality of packet size registers; and
   said plurality of crosspoint buffers in operative communication with said plurality of egress buffers.

⟵1000

15. The apparatus of claim 14 wherein each of said plurality of egress buffers, and each of said plurality of egress buffers said plurality of programmable buffer reservation size registers, and each of said plurality of egress buffers said plurality of not available counters, and each of said plurality of egress buffers said plurality of buffer not available threshold registers, and each of said plurality of egress buffers said plurality of packet size registers have a plurality of priority levels.

16. The apparatus of claim 15 further comprising:
   wherein each of said plurality of ingress buffers, and each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels; and
   wherein each of said plurality of crosspoint buffers, and each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

FIG. 10

METHOD AND APPARATUS FOR ADAPTIVE BUFFER MANAGEMENT FOR TRAFFIC OPTIMIZATION ON SWITCHES

RELATED APPLICATION

This application is related to application Ser. No. 12/639,554 filed this same date by the same inventors titled "Method and Apparatus for Programmable Buffer with Dynamic Allocation to Optimize System Throughput with Deadlock Avoidance on Switches", which is hereby incorporated herein by reference in its entirety including all incorporated references therein.

FIELD OF THE INVENTION

The present invention pertains to switches. More particularly, the present invention relates to a method and apparatus for adaptive buffer management for traffic optimization on switches.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

There are 4 different priority levels specified in the sRIO standard for Virtual Channel 0 (VC0). Traffic flow may change dynamically in real time as there can be more priority level traffic flowing through within a certain period but on other occasions, very limited priority levels may appear within the switch fabric.

Assigning a fixed amount of buffers to each priority (level) may not be able to utilize all the available buffers efficiently because if there is no traffic with a certain priority, the buffers being allocated to that priority will be wasted. This presents a problem.

In order to determine the desired buffer size to sustain higher priority traffic with long ACK (acknowledgment) delay, total path delay from transmitted a packet's EOP (end of packet) to the received ACK needs to be identified along with buffer release latency for each connected device which may require pre-calculation with traffic monitoring. Pre-calculation is a time consuming process which requires the availability of product spec with detailed understanding. This presents a problem.

Additionally, this approach would require the user to be aware of system topology with total path delay (such as outbound sRIO protocol stack, PCB (printed circuit board) traces, inbound sRIO protocol stack, ACK generation, etc) being calculated in advance for each connected device in order to set up the right reserved buffer size for each priority level. This presents a problem.

Further, traffic monitoring with delay path measurement may be inaccurate as some of the timing paths may not be visible externally. This presents a problem.

BRIEF DESCRIPTION OF THE DRAWINGS

The invention is illustrated by way of example and not limitation in the figures of the accompanying drawings in which:

FIG. 9 illustrates various embodiments of the invention.

FIG. 10 illustrates various embodiments of the invention.

DETAILED DESCRIPTION

Figure 1:
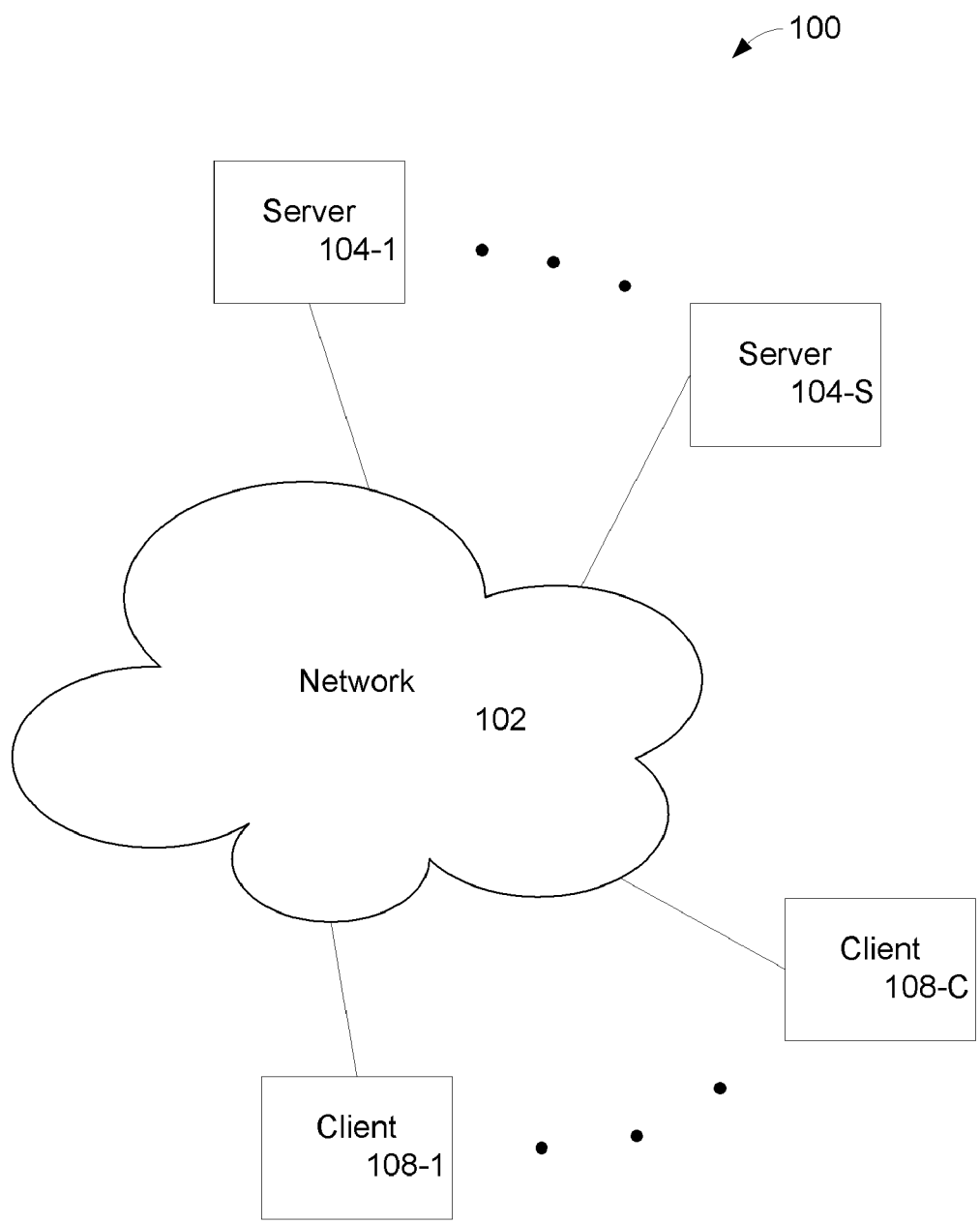
FIG. 1 illustrates a network environment in which the method and apparatus of the invention may be implemented.

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360Gbit) with minimum latency (<30 ns excluding sRIO protocol stack delay) to meet wireless infrastructure customer's requirements for WCDMA/LTE Base Stations. In order to achieve the target performance under any traffic conditions with the lowest product cost, a technique has been developed to allow memory buffers to be allocated dynamically. Each higher priority can also be configured with programmable buffer reservation, which will prevent deadlock and allow higher priority traffic to retain full bandwidth while lower priority is being congested with long ACK latency.

In one embodiment of the invention, an innovative technique has been developed by identifying the proper reserved buffer size for each priority through pattern injection and traffic monitoring with a set of pre-defined counters/registers. By forcing congesting on lower priority traffic and observe full bandwidth on higher priority traffic with the proper reserved buffer size, optimized performance can be achieved without manual instrumentation. Furthermore, packet size can be adjusted to identify the minimum size that can still maintain full bandwidth based on the reserved buffer size, which can be used to identify the optimized packet size to achieve maximum throughput with minimum latency.

In one embodiment of the invention, a programmable buffer with dynamic allocation can be used to optimize buffer usage, prevent deadlock and allow higher priority to retain full bandwidth while lower priority is being congested with long ACK latency and a technique can be used to identify the proper buffer size by injecting a specific traffic pattern and monitoring system throughput via buffer usage. Based on the expected system throughput, the desired buffer size can be programmed accordingly.

In one embodiment of the invention, after the proper reserved buffer size has been determined and programmed, the packet size can be adjusted/decremented with a specific traffic pattern being applied to identify the range of the packet size that can sustain the desired system throughput. This allows the optimized buffer reservation size for each priority and packet size range to be identified through hardware to achieve optimized throughput and latency.

In one embodiment of the invention, each priority will have its corresponding buffer reservation size register, buffer not available count register (buf_not_ava_cnt register); buffer not available threshold register (buf_not_ava_thresh register) and packet size register (pkt_size register) that can be used to adjust buffer reservation size adaptively to support the optimized traffic flow with different ACK delay among each Egress port.

In one embodiment of the invention, each priority of the Egress port can be instrumented at a time. For example, to identify the optimized buffer reservation size and packet size range on Egress Port 0, buffer reservation size for priority 3 can be programmed to 1 first and priority 2 packets can be over-subscribed from Port 1 & Port 2 to cause back pressure from Egress port 0. Priority 3 packets will then be injected from Port 0 with maximum packet size of 35 dwords (for example). Next the buf_not_ava_cnt for priority 3 will be incremented by 1 at EOP (end of packet) cycle each time if a subsequent packet of this priority cannot be transferred from Switch Fabric to Egress Port 0's Final Buffer due to insufficient buffer space (see for example, FIG. 3). At the end of the traffic injection, if buf_not_ava_cnt is greater than buf_not_ava_thresh, then the buffer reservation size for priority 3 will be incremented by 1 and the above sequence will repeat to identify the proper buffer reservation size in order to sustain priority 3 traffic. After the desired buffer reservation size has been determined for priority 3 traffic, the packet size can be decremented with the same traffic pattern being injected to identify the smallest packet size that can still maintain the data rate of priority 3 traffic. The optimized buffer reservation size and packet size for priority 2 and priority 1 traffic can be identified similarly (enforce congestion on lower priority and check bandwidth on higher priority). Each Egress Port can follow the same technique to identify the proper reserved buffer size for each priority along with the packet size to retain full bandwidth on non-congested traffic.

For certain applications that use fixed packets to achieve the desired flow latency with timing critical data plane traffic and requires full bandwidth support on higher priority traffic while lower priority are being congested with long ACK latency, above approach provides an elegant solution by identifying the optimized buffer size and packet size range to accomplish this goal without needing to pre-calculate or measure total path delay of the connected devices for each Egress port.

Figure 3:
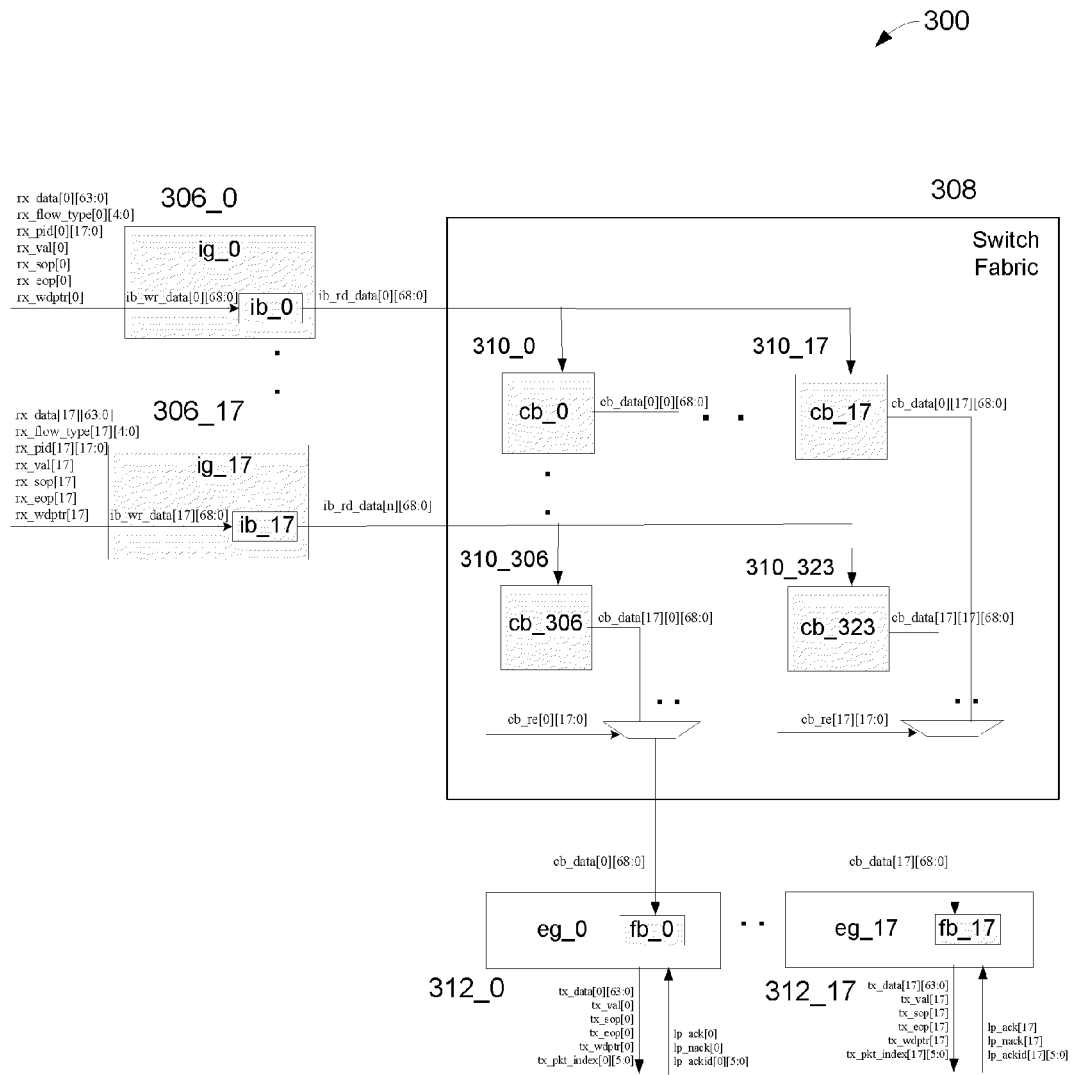
FIG. 3 illustrates one embodiment of the invention showing a data path.

FIG. 3 illustrates, generally at 300, one embodiment of the invention showing a switch data path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig_0 through ig_17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib_0 through ib_17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib_0 through ib_17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb_0 through cb_323.

In FIG. 3, at 312_0 through 312_17 are egress ports (eg_0 through eg_17) each receiving a variety of inputs from the switch fabric 308 (cb_data[q][68:0]), where q denotes the egress port number (0 through 17). Each egress port has an egress buffer denoted fb_0 through fb_17. Each egress port has outputs, for example, transmit data (tx_data[q][63:0]), transmit valid cycle (tx_val[q]), transmit start of packet (tx_sop[q]), transmit end of packet (tx_eop[q]), transmit word pointer (tx_wdptr[q]), and transmit packet index (tx_pkt_index[q][5:0]), where q denotes the egress port number (0 through 17). Each egress port also has inputs received from a link partner, for example link partner ack (lp_ack[q]), link partner nack (lp_nack[q]), and link partner ack ID (lp_ackid[q][5:0]) where again q denotes the egress port number (0 through 17).

In one embodiment of the invention there are programmable buffer reservation size registers. Each VC0 priority level (except priority 0) will have its corresponding buffer reservation size register for Input Buffer (e.g. ib_0 through ib_17 in FIG. 3), Crosspoint Buffer (e.g. cb_0 through cb_323 in FIG. 3), and Final Buffer (e.g. fb_0 through fb_17 in FIG. 3) which can be programmed by software. These registers can be used to preserve a number of buffers dedicated for each higher priority level packets if these priority levels don't have any packets that are currently present in the buffer yet. This scheme can prevent deadlock as higher priority packets shall always be allowed for accepting if they are not present in the buffer yet. In addition, lower priority traffic being congested would not degrade higher priority traffic's throughput if the desired buffer number can be allocated to these priority levels to sustain full bandwidth. If ACK latency is longer than expected, buffer reservation size for each priority level can be further increased to maintain full data rate.

Figure 4:
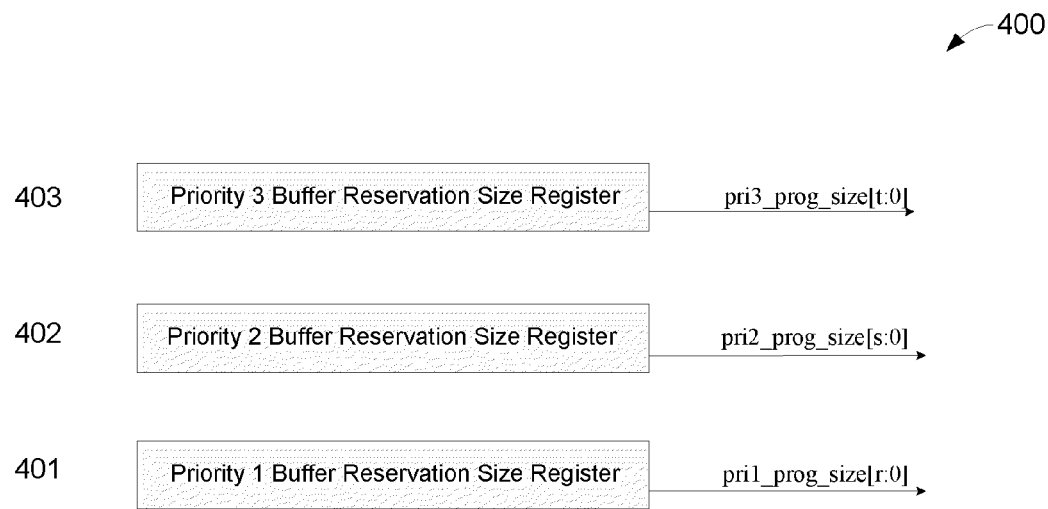
FIG. 4 illustrates one embodiment of the invention showing programmable priority buffer reservation size registers.

FIG. 4 illustrates, generally at 400, one embodiment of the invention showing three representative programmable buffer reservation size registers for 3 different priorities. At 401 is a programmable size for priority 1 (Priority 1 Buffer Reservation Size Register) represented by bits pri1_prog_size[r:0]. At 402 is a programmable size for priority 2 (Priority 2 Buffer Reservation Size Register) represented by bits pri2_prog_size[s:0]. At 403 is a programmable size for priority 3 (Priority 3 Buffer Reservation Size Register) represented by bits pri3_prog_size[t:0].

In one embodiment of the invention, there are three programmable buffer size reservation registers for each priority of 1, 2, and 3 associated with each input buffer (e.g. ib_0 through ib_17 in FIG. 3), crosspoint buffer (e.g. cb_0 through cb_323 in FIG. 3) and final buffer (e.g. fb_0 through fb_17 in FIG. 3).

In one embodiment of the invention, the Final Buffer (e.g. fb_0 through fb_17 in FIG. 3) has more memory blocks therefore more bits will be used for these registers as more buffers can be reserved for each priority.

In one embodiment of the invention, the Input Buffer (e.g. ib_0 through ib_17 in FIG. 3) and Crosspoint Buffer (e.g. cb_0 through cb_323 in FIG. 3) have less memory blocks therefore less bits will be needed for these registers In one embodiment of the invention, these registers can be programmed by software at initialization time based on the number of buffers need to be reserved for retaining full bandwidth (either no congestion or lower priority being congested with full bandwidth support on higher priority).

In one embodiment of the invention, egress ports (e.g. eg_0 through eg_17 in FIG. 3) with longer ACK latency may need more buffers to retain full bandwidth therefore more buffers will need to be programmed/reserved in these registers for each priority levels.

In one embodiment of the invention, these registers can also be adjusted by hardware through traffic injection and bandwidth observation. If insufficient buffers are being allocated, throughput may be degraded as full bandwidth cannot be maintained while the packets are being written into the buffer. Buffer size can be increased until full bandwidth is observed to achieve optimized traffic flow.

In one embodiment of the invention each VC0 priority level (except priority 0) will have its corresponding Buffer Not Available Counter for Input Buffer, Crosspoint Buffer, and Final Buffer. The Counter for each priority will be incremented by 1 at EOP cycle each time a packet is being transferred into the corresponding buffer from the previous stage while the buffer is not available to accept the subsequent packet with this priority level. This information can be used to indicate that there is no sufficient buffer available for the respective priority to support back to back transfers with full bandwidth. As a result, the reserved buffer for this priority should be increased accordingly.

Figure 5:
FIG. 5 illustrates one embodiment of the invention showing programmable priority buffer not available counters.

FIG. 5 illustrates, generally at 500, one embodiment of the invention showing three representative buffer not available counters for 3 different priorities. At 501 is a Priority 1 Buffer Not Available Counter (Priority 1 Buffer Not Available Counter) represented by pri1_buf_not_ava_cnt[u:0]. At 502 is a Priority 2 Buffer Not Available Counter (Priority 2 Buffer Not Available Counter) represented by bits pri2_buf_not_ava_cnt[v:0]. At 503 is a Priority 3 Buffer Not Available Counter (Priority 3 Buffer Not Available Counter) represented by bits pri3_buf_not_ava_cnt[w:0].

In one embodiment of the invention, there are Buffer Not Available Counters for each priority of 1, 2, and 3 for each Input Buffer, Crosspoint Buffer, and Final Buffer.

In one embodiment of the invention, lower priority traffic can be over-subscribed first to cause congestion. Higher priority traffic can then be injected for bandwidth measurement. For example, over-subscribe priority 2 traffic and inject priority 3 packets.

In one embodiment of the invention, each time a packet is being written into a buffer from the previous stage, if there is no buffer available for this priority at EOP cycle to accommodate the subsequent packets, then the respective Buffer Not Available Counter will be incremented by 1.

In one embodiment of the invention, after higher priority packet injection is done, the Buffer Not Available Counter for this priority will be compared against a pre-defined Buffer Not Available Threshold register. Bandwidth degradation may exceed the desired limit if the Buffer Not Available Count exceeded the Buffer Not Available threshold.

In one embodiment of the invention, the reserved buffer needs to be increased and repeat traffic injection with bandwidth measurement until the Buffer Not Available Count has dropped below the Buffer Not Available threshold.

In one embodiment of the invention, the desired buffer reservation size for Priority 2, and Priority 1 can be identified the same way as previously discussed through their corresponding Buffer Not Available Counters and Buffer Not Available Threshold Registers.

In one embodiment of the invention each VC0 priority level (except priority 0) will have its corresponding Buffer Not Available Threshold register for Input Buffer, Crosspoint Buffer, and Final Buffer which can be programmed by software. The register for each priority indicates a buffer not available threshold which can be used to measure the capability for back to back transfers. If 0 is specified, full bandwidth can be retained as there is no single buffer unavailable occurrence for any packet transfers. If a low threshold value is specified, buffer unavailable occurrence is very limited which can be used to define the acceptable throughput based on target applications.

Figure 6:
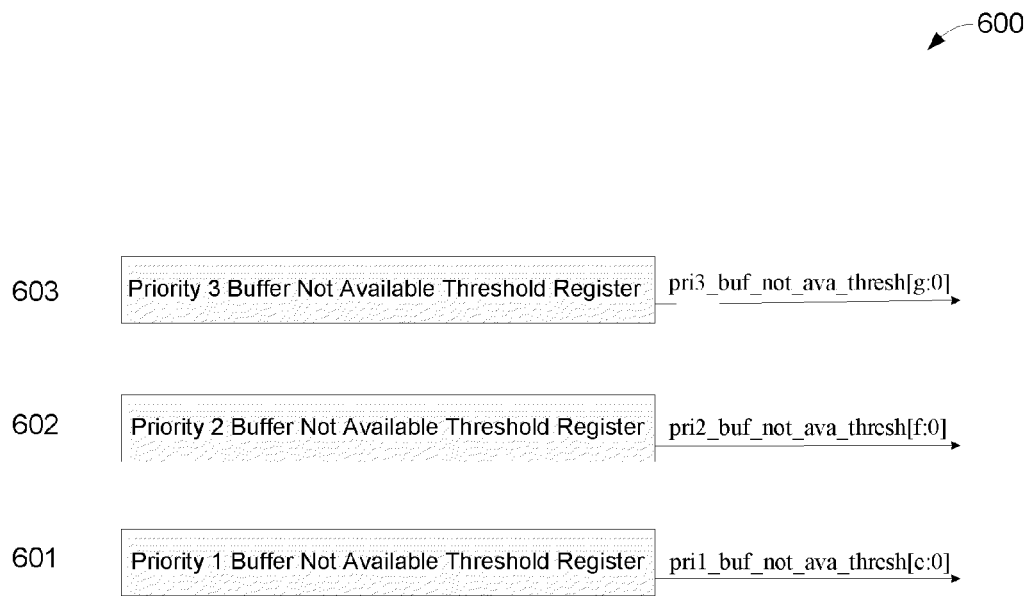
FIG. 6 illustrates one embodiment of the invention showing programmable buffer not available threshold registers.

FIG. 6 illustrates, generally at 600, one embodiment of the invention showing three representative buffer not available threshold registers for 3 different priorities. At 601 is a Priority 1 Buffer Not Available Threshold Register (Priority 1 Buffer Not Available Threshold Register) represented by pri1_buf_not_ava_thresh[e:0]. At 602 is a Priority 2 Buffer Not Available Threshold Register (Priority 2 Buffer Not Available Threshold Register) represented by bits pri2_buf_not_ava_thresh[f:0]. At 603 is a Priority 3 Buffer Not Available Threshold Register (Priority 3 Buffer Not Available Threshold Register) represented by bits pri3_buf_not_ava_thresh[g:0].

In one embodiment of the invention, 3 Buffer Not Available Threshold registers for each priority of 1, 2, and 3 will be required for Input Buffer, Crosspoint Buffer, and Final Buffer.

In one embodiment of the invention, the 3 Buffer Not Available Threshold registers for each priority of 1, 2, and 3 can be programmed by software at init (initialization) time based on bandwidth degradation ratios that are acceptable by target applications.

In one embodiment of the invention, while lower priority is being congested, if full bandwidth is desired on higher priority traffic, zero value needs to be programmed into the respective Buffer Not Available Threshold register.

In one embodiment of the invention, if full bandwidth is not feasible after the reserved buffer size has increased to maximum for a specific priority, the Buffer Not Available Threshold can be set to a certain value to compromise throughput against limited buffer size.

In one embodiment of the invention, each VC0 priority level (except priority 0) will have its corresponding packet size register for Input Buffer, Crosspoint Buffer, and Final Buffer. The register for each priority can be used to identify the smallest packet size that can sustain full bandwidth with the reserved buffer size.

Figure 7:
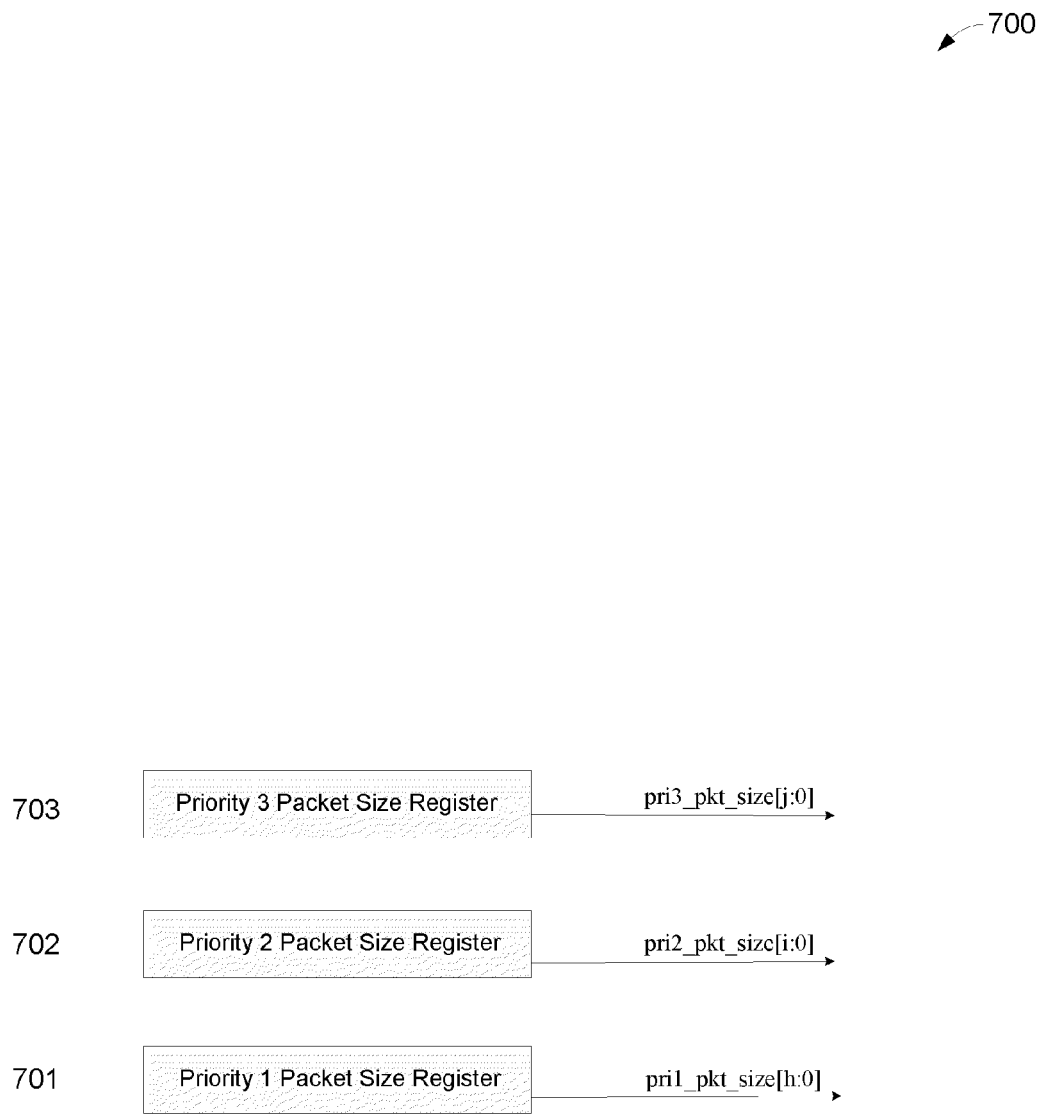
FIG. 7 illustrates one embodiment of the invention showing programmable priority packet size registers.

FIG. 7 illustrates, generally at 700, one embodiment of the invention showing three representative packet size registers for 3 different priorities. At 701 is a Priority 1 Packet Size Register (Priority 1 Packet Size Register) represented by pri1_pkt_size[h:0]. At 702 is a Priority 2 Packet Size Register (Priority 2 Packet Size Register) represented by bits pri2_pkt_size[i:0]. At 703 is a Priority 3 Packet Size Register (Priority 3 Packet Size Register) represented by pri3_pkt_size[j:0].

In one embodiment of the invention, 3 Packet Size registers for each priority of 1, 2, and 3 will be required for Input Buffer, Crosspoint Buffer, and Final Buffer.

In one embodiment of the invention, these Packet Size registers can be initialized to a maximum size packet (for example, 35 dwords) first. After the desired buffer reservation size for a specific priority has been determined through traffic injection and bandwidth measurement, the packet size can be decremented and the above process repeated using the decremented packet size.

In one embodiment of the invention, after the smallest packet size has been determined to sustain the desired bandwidth, the register for the specific priority can record this size accordingly.

In one embodiment of the invention, if full bandwidth is required for higher priority flow with congested lower priority traffic, these Packet Size registers can be used to determine the packet size to achieve optimized throughput and latency based on target applications.

In one embodiment of the invention, Adaptive Buffer Management is used to identify the proper reserved buffer size for each priority to retain full bandwidth (or acceptable bandwidth) on higher priority traffic while low priority is being congested with long ACK latency. In addition, Adaptive Buffer Management will determine the smallest packet size for each priority to retain full bandwidth based on the reserved buffer size. Through this scheme, optimized throughput and flow latency can be achieved automatically without manual calculation of the ACK delay path along with throughput measurement.

In one embodiment of the invention, Priority 3 buffer reservation size and packet size will be identified first. Buffer reservation size for priority 3 is set to minimum of 1 and packet size is set to maximum (for example, 35 dwords). Ingress Port 1 & Port 2 will be used to over-subscribe priority 2 traffic to Egress Port 0. It will cause back pressure with all the Final Buffers in Egress port 0 to be consumed with one buffer remain for priority 3 traffic. Then, start injecting priority 3 packets from Ingress port 0. Each time a packet is being transferred from Switch Fabric to Egress port 0's Final Buffer, pri3_buf_not_ava_cnt will be incremented by 1 if there is no buffer available at EOP cycle to accommodate the subsequent packet with this priority level. This scenario indicates that back to back transfers are not feasible therefore full bandwidth cannot be retained due to insufficient Final Buffer available to accommodate priority 3 traffic flows. After priority 3 packet injection and transmission are completed, pri3_buf_not_ava_cnt will be compared against a pre-defined pri3_buf_not_ava_thresh. If count is less than or equal to the threshold setting, the reserved buffer for priority 3 is sufficient to sustain the desired bandwidth (or full bandwidth if pri3_buf_not_ava_thresh is set to 0) while priority 2 is being congested. Otherwise, the reserved buffer for priority 3 will be incremented by 1 and the above sequence will repeat until the proper buffer reservation size has been identified to sustain priority 3 traffic. The desired buffer reservation size will be stored into pri3_prog_size register.

In one embodiment of the invention, after the proper buffer size reservation has been identified for priority 3 traffic, the smallest packet size that can be used to sustain priority 3 traffic will be checked next. pkt_size register which was loaded with maximum packet size (for example, 35 dwords) will be decremented by 1 and priority 3 packets will be injected the same way with the same check between pri3_buf_not_ava_cnt and pri3_buf_not_ava_thresh until the packet size being decremented to a threshold that cannot sustain the desired bandwidth (or full bandwidth if pri3_buf_not_ava_thresh is set to 0) of the priority 3 traffic. The smallest packet size being used to retain the desired bandwidth on priority 3 traffic will be loaded into pri3_pkt_size register.

In one embodiment of the invention, the same scheme as discussed above can be applied to priority 2 and priority 1 flows to identify their corresponding reserved buffer size and packet size to sustain the desired bandwidth of these priority levels. For instance, in order to check priority 2's buffer reservation and packet size, priority 1 packets shall be over-subscribed to ensure that all the available buffers will be used for this priority with the exception of the previous determined priority 3's reserved buffer size and the currently assigned priority 2 buffers. After priority 2's buffer reservation size has been identified, its packet size can also be determined accordingly.

In one embodiment of the invention, after the desired buffer reservation and packet size have been determined for priority 3, 2, and 1 of Egress port 0, the remaining Egress ports can follow the same scheme to identify their respective reserved buffer size and packet size. With the desired buffer reservation and packet size in place, higher priority traffic shall be able to retain its desired bandwidth while lower priority is being congested with longer ACK latency. More importantly, system performance can be optimized to achieve maximum throughput with minimum latency without needing manual calculation and measuring of the delay paths between the switch and the connected devices. For Crosspoint Buffer and Input Buffer, it can be done similarly (congest lower priority and inject high priority with bandwidth measurement) though simpler as they are internal to the switch Fabric, packet transfers can be really fast at a 20G rate along with buffer release (after being transferred out of the buffer). As a result, longer ACK latency will not become a factor to determine the required buffer reservation size as in general, two buffers per priority should be sufficient to retain the desired bandwidth with fairly small packet size.

Figure 8:
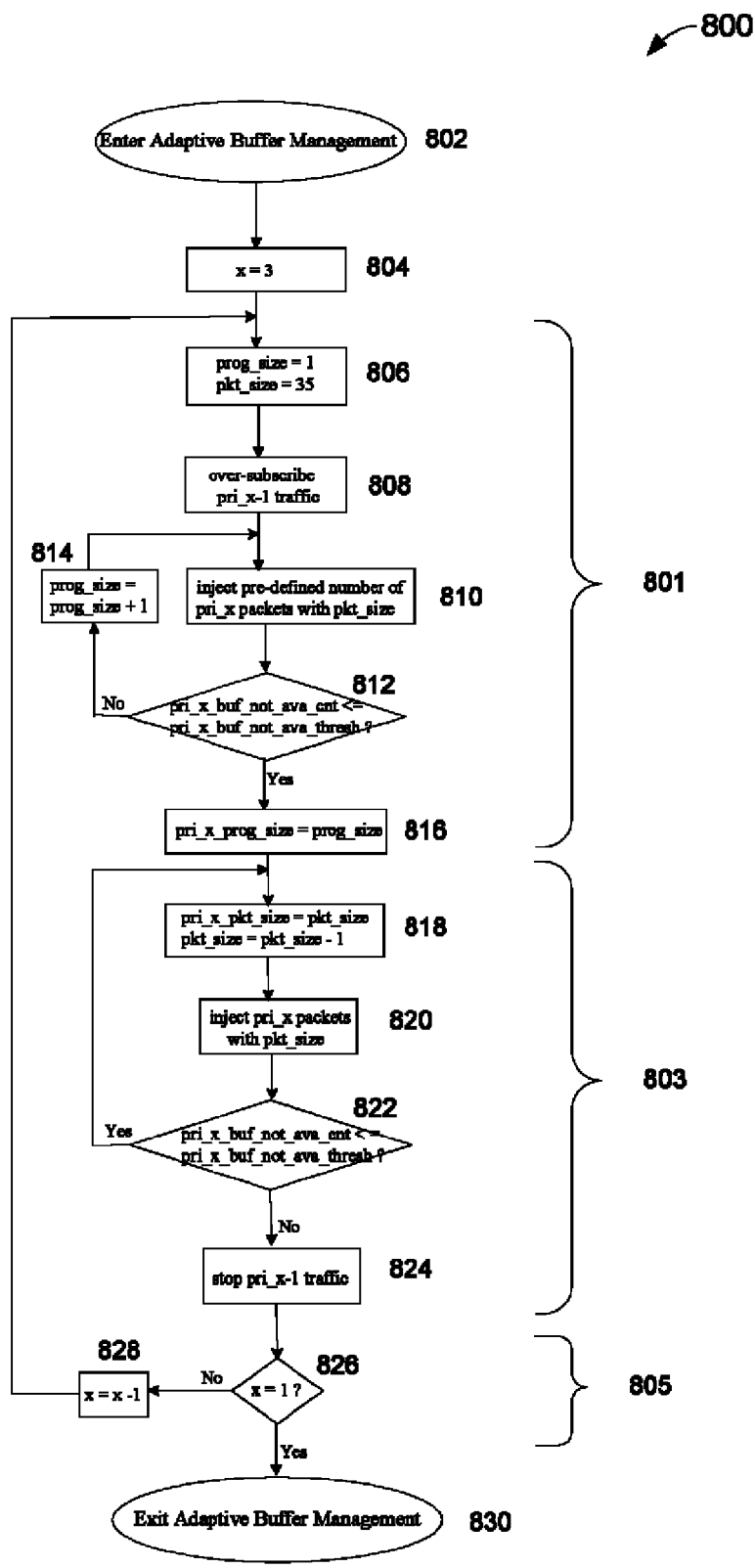
FIG. 8 illustrates one embodiment of the invention showing adaptive buffer management in flow chart form.

FIG. 8 illustrates, generally at 800, one embodiment of the invention showing adaptive buffer management. It is noted for the reader that the order of highest to lowest priority is 3, 2, 1, 0.

At a high level the flow chart in FIG. 5 details three major operations. The sequence 801 determines a buffer size for a given priority, sequence 803 determines a packet size for the given priority and determined buffer size, and sequence 805 loops for each priority.

In FIG. 8 in detail Enter Adaptive Buffer Management at 802, set initial priority x=3 at 804, set prog_size=1 (i.e. a minimum) and set pkt_size=35 (e.g. a maximum in this example) at 806, over-subscribe pri_x−1 traffic at 808, inject a pre-defined number of pri_x packets with pkt_size at 810, determine if pri_x_buf_not_ava_cnt<=ri_x_buf_not_ava_thresh at 812 and if not then at 814 set prog_size=prog_size+1 and continue at 810 otherwise at 816 set pri_x_prog_size=prog_size, at 818 set pri_x_pkt_size =pkt_size and then pkt_size=pkt_size−1, at 820 inject pri_x packets with pkt_size, determine if pri_x_buf_not_ava_cnt<=pri_x_buf_not_ava_thresh and if yes then continut at 818 otherwise at 824 stop pri_x−1 traffic, at 826 determine if x=1 and if not then at 828 set x=x−1 and continue at 806 otherwise Exit Adaptive Buffer Management 830.

One of skill in the art will appreciate that there are a variety of ways to inject traffic (e.g. simulate inputs, etc.), monitor traffic (e.g. status signals, etc.), as well as forcing congestion (e.g. forcing NACK, etc.). These are not germane to understanding the techniques disclosed and therefore not discussed in detail.

One of skill in the art will appreciate that the techniques disclosed can accommodate actual downstream (e.g. from the Final Buffer) path delays. That is, Link Partner latency and delays (i.e. actual delays of the system) can be compensated for.

While the technique for determining a buffer size and then a packet size range for a level of performance has been disclosed, the invention is not so limited and in another embodiment of the invention, a packet size may be chosen and a range of buffer sizes for a level of performance may be determined.

While various embodiments of the present invention have been illustrated with 4 priority levels (e.g. 0, 1, 2, 3) the invention is not so limited and the techniques disclosed may be used with less than 4 priority levels and with more than 4 priority levels.

FIG. 9 and FIG. 10 illustrate various embodiments of the invention where is shown at:

1. A method comprising:
   setting a priority level denoted x to a highest priority level from a plurality of unique priority levels;
   (a) setting a buffer reservation size denoted prog_size to a minimum size;
   (b) setting a packet size denoted pkt_size to a maximum packet size;
   (c) over-subscribing a x−1 priority level denoted pri_x−1 traffic;
   (d) injecting a pre-defined number of priority x packets, said pre-defined number of priority x packets each having a packet size of pkt_size;
   (e) determining if a priority x buffer not available count denoted pri_x_buf_not_ava_cnt is less than or equal to a priority x buffer not available threshold denoted pri_x_buf_not_ava_thresh; and
   (f) if said pri_x_buf_not_ava_cnt is less than or equal to said pri_x_buf_not_ava_thresh then:
      (f1) setting said prog_size to prog_size+1; and
      (f2) returning to (d);
   (g) setting a buffer reservation size register for said priority level x denoted pri_x_prog_size to said prog_size.

2. The method of claim 1 further comprising:
   (h) setting a packet size register for said priority x denoted pri_x_pkt_size;
   (i) setting said pkt_size to pkt_size−1;
   (j) injecting priority x packets, said priority x packets each having a packet size of pkt_size;
   (k) determining if said pri_x_buf_not_ava_cnt is less than or equal to said pri_x_buf_not_ava_thresh; and
   (l) if said pri_x_buf_not_ava_cnt is less than or equal to said pri_x_buf_not_ava_thresh then:
      (f1) returning to (h);
   (m) stopping said pri_x−1 traffic;
   (n) determining if said priority level x is equal to 1; and
   (o) if said priority level x is equal to 1 then:
      (o1) returning to (a).

3. The method of claim 2 further comprising:
   repeating (a)-(o) for a plurality of ingress buffers; and
   repeating (a)-(o) for a plurality of egress buffers.

4. The method of claim 3 further comprising:
   repeating (a)-(o) for a plurality of crosspoint buffers.

5. A method comprising:
   forcing congestion on all priority levels lower than a highest priority level;
   injecting traffic at said highest priority level;
   observing performance of said traffic at said highest priority level; and
   adjusting a buffer for said highest priority level based on said observed performance.

6. The method of claim 5 wherein said injecting traffic travels through actual physical system delays.

7. The method of claim 5 wherein said observing performance of said traffic includes observing said traffic traveling off of an integrated circuit (IC).

8. The method of claim 7 wherein said traffic traveling off of an IC is selected from the group consisting of delays off said IC, latency off said IC, and trace delays off said IC.

10. An apparatus comprising:
   a plurality of ingress ports, wherein each of said plurality of ingress ports has a plurality of ingress buffers, said plurality of ingress buffers each having a plurality of programmable buffer reservation size registers, and a plurality of not available counters, and a plurality of buffer not available threshold registers, and a plurality of packet size registers.

11. The apparatus of claim 10 wherein each of said plurality of ingress buffers, and each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels.

12. The apparatus of claim 10 further comprising:
   a plurality of crosspoint buffers, said plurality of crosspoint buffers each having a plurality of programmable buffer reservation size registers, and a plurality of not available counters, and a plurality of buffer not available threshold registers, and a plurality of packet size registers; and
   said plurality of crosspoint buffers in operative communication with said plurality of ingress buffers.

13. The apparatus of claim 12 wherein each of said plurality of crosspoint buffers, and each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

14. The apparatus of claim 12 further comprising:
   a plurality of egress ports, wherein each of said plurality of egress ports has a plurality of egress buffers, said plurality of egress buffers each having a plurality of programmable buffer reservation size registers, and a plurality of not available counters, and a plurality of buffer not available threshold registers, and a plurality of packet size registers; and
   said plurality of crosspoint buffers in operative communication with said plurality of egress buffers.

15. The apparatus of claim 14 wherein each of said plurality of egress buffers, and each of said plurality of egress buffers said plurality of programmable buffer reservation size registers, and each of said plurality of egress buffers said plurality of not available counters, and each of said plurality of egress buffers said plurality of buffer not available threshold registers, and each of said plurality of egress buffers said plurality of packet size registers have a plurality of priority levels.

16. The apparatus of claim 15 further comprising:
   wherein each of said plurality of ingress buffers, and each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels; and wherein each of said plurality of crosspoint buffers, and each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

Thus a method and apparatus for adaptive buffer management for traffic optimization on switches have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
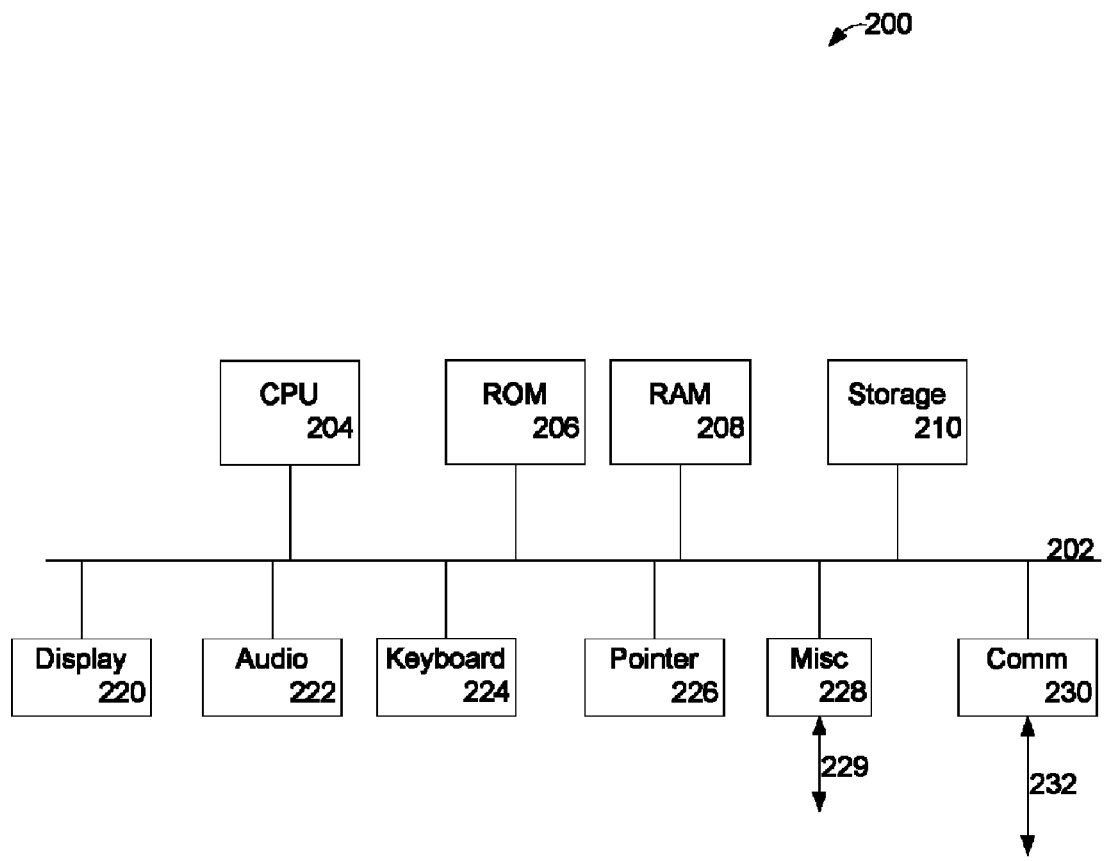
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204 Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210 may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk- read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: failsafe is also spelled fail safe, and failsafe; start-up is also spelled startup, and start up; subthreshold is also spelled sub-threshold, and sub threshold; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for adaptive buffer management for traffic optimization on switches have been described.

What is claimed is:

1. An apparatus comprising a computer, said computer configured for:
   setting a priority level denoted x to a highest priority level from a plurality of unique priority levels;
   (a) setting a buffer reservation size denoted prog_size to a minimum size;
   (b) setting a packet size denoted pkt_size to a maximum packet size;
   (c) over-subscribing a x−1 priority level denoted pri_x−1 traffic;
   (d) injecting a pre-defined number of priority x packets, said pre-defined number of priority x packets each having a packet size of pkt_size;
   (e) determining if a priority x buffer not available count denoted pri_x_buf_not_ava_cnt is less than or equal to a priority x buffer not available threshold denoted pri_x_buf_not_ava_thresh; and
   (f) if said pri_x_buf_not_ava_cnt is less than or equal to said pri_x_buf_not_ava_thresh then:
      (f1) setting said prog_size to prog_size+1; and
      (f2) returning to step (d);
   (g) setting a buffer reservation size register for said priority level x denoted pri_x_prog_size to said prog_size.

2. The apparatus of claim 1 further comprising:
   (h) setting a packet size register for said priority level x denoted pri_x_pkt_size to said pkt_size;
   (i) setting said pkt_size to pkt_size−1;
   (j) injecting priority x packets, said priority x packets each having a packet size of pkt_size;

(k) determining if said pri_x_buf_not_ava_cnt is less than or equal to said pri_x_buf_not_ava_thresh; and
(l) if said pri_x_buf_not_ava_cnt is less than or equal to said pri_x_buf_not_ava_thresh then:
(l1) returning to step (h);
(m) stopping said pri_x−1 traffic;
(n) determining if said priority level x is equal to 1; and
(o) if said priority level x is equal to 1 then:
(o1) returning to step (a).

3. The apparatus of claim 2 further comprising:
repeating steps (a)-(o) for a plurality of ingress buffers; and
repeating steps (a)-(o) for a plurality of egress buffers.

4. The apparatus of claim 3 further comprising:
repeating steps (a)-(o) for a plurality of crosspoint buffers.

5. An apparatus comprising:
a plurality of ingress ports, wherein each of said plurality of ingress ports has a plurality of inqress buffers, said plurality of ingress buffers each having a plurality of programmable buffer reservation size registers, and a plurality of not available counters, and a plurality of buffer not available threshold registers, and a plurality of packet size registers, wherein each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels.

6. An apparatus comprising:
a plurality of ingress ports, wherein each of said plurality of ingress ports has a plurality of inqress buffers, said plurality of ingress buffers each having a plurality of programmable buffer reservation size registers, and a plurality of not available counters, and a plurality of buffer not available threshold registers, and a plurality of racket size registers;
a plurality of crosspoint buffers, said plurality of crosspoint buffers each having a plurality of programmable buffer reservation size registers, and a plurality of not available counters, and a plurality of buffer not available threshold registers, and a plurality of packet size registers; and
said plurality of crosspoint buffers in operative communication with said plurality of ingress buffers.

7. The apparatus of claim 6 wherein each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

8. The apparatus of claim 6 further comprising:
a plurality of egress ports, wherein each of said plurality of egress ports has a plurality of egress buffers, said plurality of egress buffers each having a plurality of programmable buffer reservation size registers, and a plurality of not available counters, and a plurality of buffer not available threshold registers, and a plurality of packet size registers; and
said plurality of crosspoint buffers in operative communication with said plurality of egress buffers.

9. The apparatus of claim 8 wherein each of said plurality of egress buffers said plurality of programmable buffer reservation size registers, and each of said plurality of egress buffers said plurality of not available counters, and each of said plurality of egress buffers said plurality of buffer not available threshold registers, and each of said plurality of egress buffers said plurality of packet size registers have a plurality of priority levels.

10. The apparatus of claim 9 further comprising:
wherein each of said plurality of ingress buffers said plurality of programmable buffer reservation size registers, and each of said plurality of ingress buffers said plurality of not available counters, and each of said plurality of ingress buffers said plurality of buffer not available threshold registers, and each of said plurality of ingress buffers said plurality of packet size registers have a plurality of priority levels; and
wherein each of said plurality of crosspoint buffers said plurality of programmable buffer reservation size registers, and each of said plurality of crosspoint buffers said plurality of not available counters, and each of said plurality of crosspoint buffers said plurality of buffer not available threshold registers, and each of said plurality of crosspoint buffers said plurality of packet size registers have a plurality of priority levels.

* * * * *